WILLIAM T. RANKER
INVENTOR.

BY

WILLIAM T. RANKER
INVENTOR.

BY

ATTORNEYS

United States Patent Office 3,231,957
Patented Feb. 1, 1966

3,231,957
APPARATUS FOR EXTRUSION COATING OF PIPE
William T. Ranker, Norwalk, Calif., assignor to Pipe Linings, Inc., Wilmington, Calif., a corporation of California
Filed July 20, 1962, Ser. No. 211,257
6 Claims. (Cl. 25—38)

This invention has to do with the coating of pipe or conduit with cement motor or other material and particularly with apparatus for coating pipe wherein the pipe section is radially enlarged at some region.

In one method of coating pipe with cement mortar or other material the pipe is moved axially through a casing containing the coating material, the pipe emerging through a restricted opening along with an extruded coating of the material. While this type of apparatus is satisfactory for use in coating pipe which has the same diameter from end to end, it has not been practical for use in coating pipe sections having radially enlarged portions, such as bell end pipe, because the casing is inflexible at the extrusion opening.

An object of the present invention is to provide a new and improved apparatus of the type indicated which automatically compensates for the passage of radially enlarged portions of a pipe and which thus is suitable for coating both standard pipe having the same diameter from end to end and also suitable for coating pipe having different diameters at different portions of its length, such as bell end pipe.

Another object is to provide an improved conoidal extrusion member or cone at the outlet end of the casing through which the cement mortar or other material is extruded and troweled upon the outer surface of the pipe. More particularly it is an object to provide a special conoidal end section on an extrusion type of pipe coating machine in which the conoidal member is provided with one or more hinged sections which are yieldably held in proper position for coating the main portion of a pipe or conduit section, but which can move outwardly when an enlarged portion of the pipe passes therethrough in order to pass and properly coat such portion.

Still another object is to provide a device such as indicated which can also be used for applying mastic or other coatings which are required to be subjected to heat during application.

These and other objects will be apparent from the drawings and the following description. Referring to the drawings.

Figure 1:
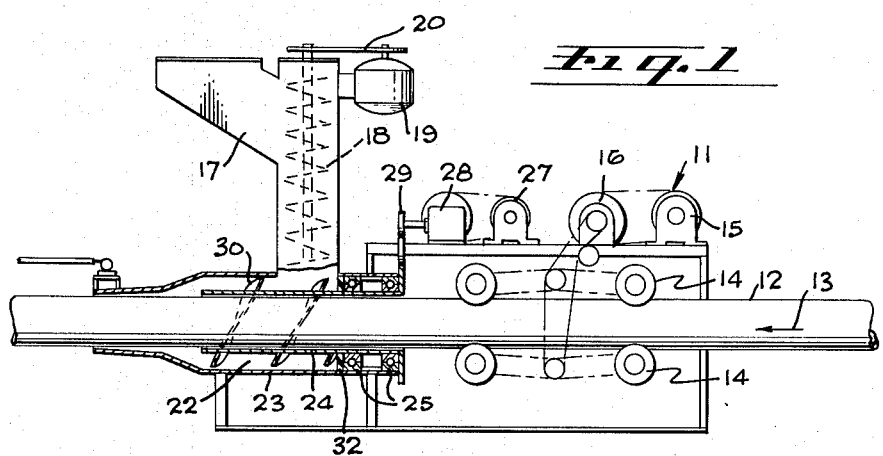
FIG. 1 is a sectional elevational view, somewhat diagrammatic, of extrusion-type coating machine embodying the invention.

More particularly describing the invention, referring first to FIG. 1, a pipe coating machine 11 of the type wherein the coating material is extruded on the outer surface of the pipe as the pipe leaves the machine is shown in conjunction with a pipe, designated 12 which is being passed through the machine in the direction of the arrow 13 thereon. Pairs of traction drive wheels 14 above and below the pipe, driven by a motor 15 through the medium of a reduction gear unit 16, and appropriate chains and sprockets as shown in the view, serve to propel pipe sections through the apparatus at a desired speed and in a manner known in the art.

The machine includes a hopper 17 which has a vertical screw feed member 18 driven by a motor 19 through the medium of an operative connection 20. The hopper extends upwards from a mortar chamber 22 defined by a casing 23 and a tube 24 which is mounted in bearings 25 for rotation therein. The tube is driven by a motor 27 through reduction gearing 28 and gearing 29. A helical feed vane 30 is provided on the tube to propel the cement mortar M or other materials toward the extrusion end of the apparatus. A suitable seal ring 32 is provided to prevent escape of the coating material into the area of the bearings.

Referring now particularly to FIGS. 2–5, the extrusion end of the casting 23 is provided with a stationary main cone 34 of frusto-conical shape and which can be detachably secured to the casing 23 by bolts 35 extending through flanges 23' and 34' on the parts. Extending beyond the section 34 is an extrusion cone section which is generally frusto-conical and includes two hingedly mounted sections 36, each of which extends circumferentially about 120 degrees, and a stationary portion comprised of an annular portion 38 and a portion 39 extending axially therefrom and extending circumferentially between the two hinged sections. The stationary portion is rigidly attached to the main cone section 34 by welding or other means. As is apparent from FIGS. 2 and 4, the segmental extrusion cone section is much less steeply inclined than the main cone section 34.

Figure 2:
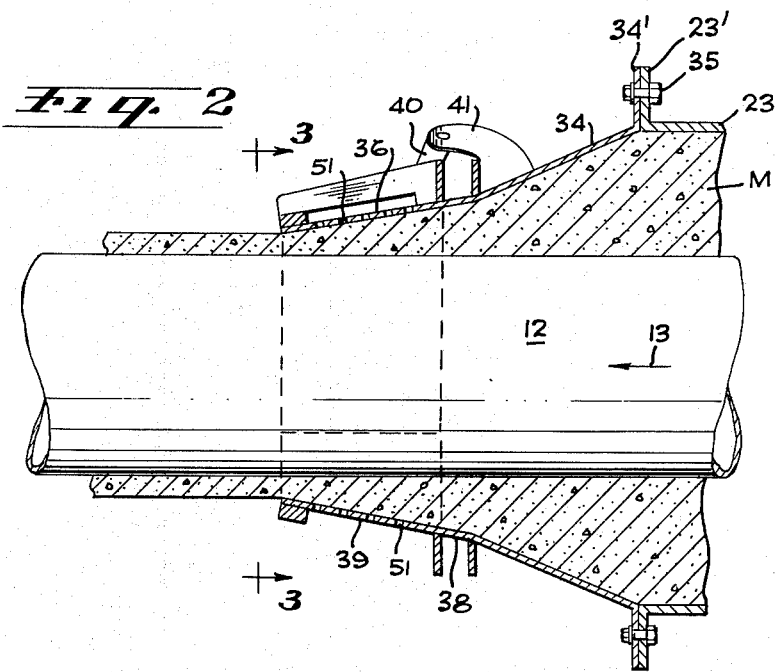
FIG. 2 is an enlarged vertical sectional view through the extrusion end of the apparatus of FIG. 1 showing apparatus embodying the invention.
Figure 4:
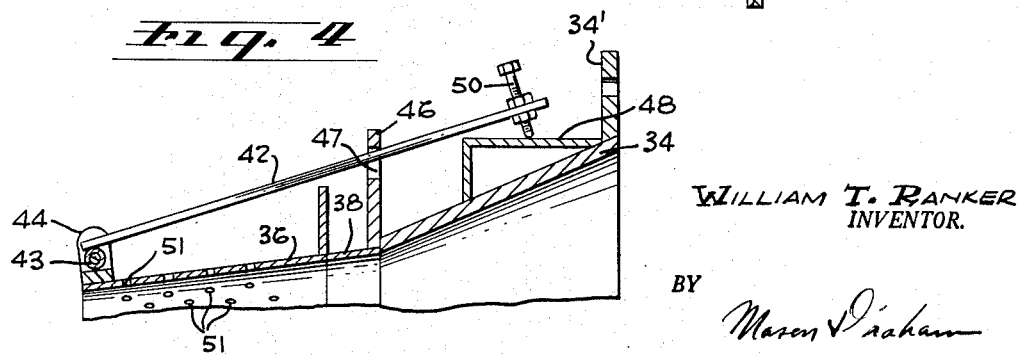
FIG. 4 is an enlarged fragmentary sectional view on line 4—4 of FIG. 3.
Figure 3:
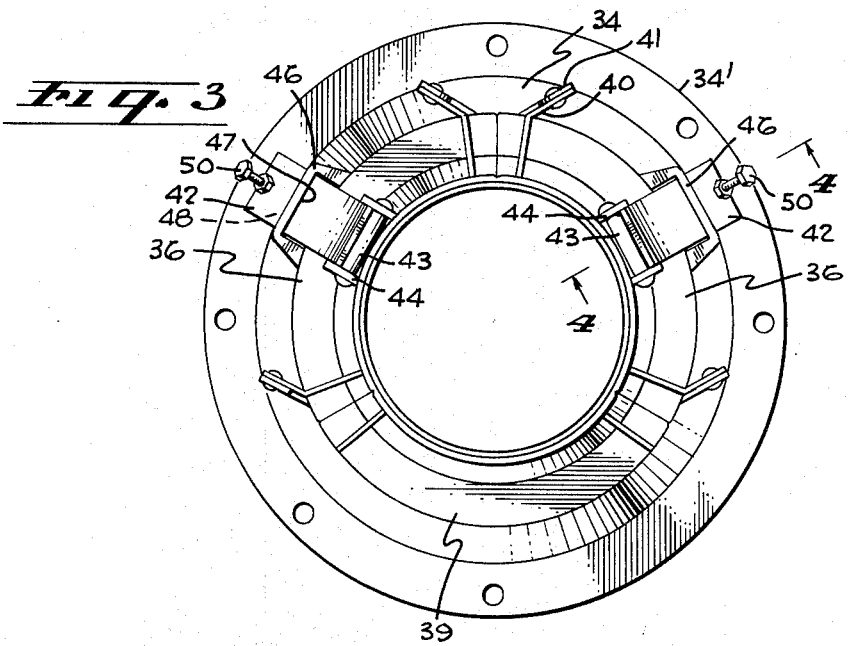
FIG. 3 is an end elevational view of the apparatus of FIG. 2, as on line 3—3 of FIG. 2 but with the cement mortar and pipe deleted.
Figure 5:
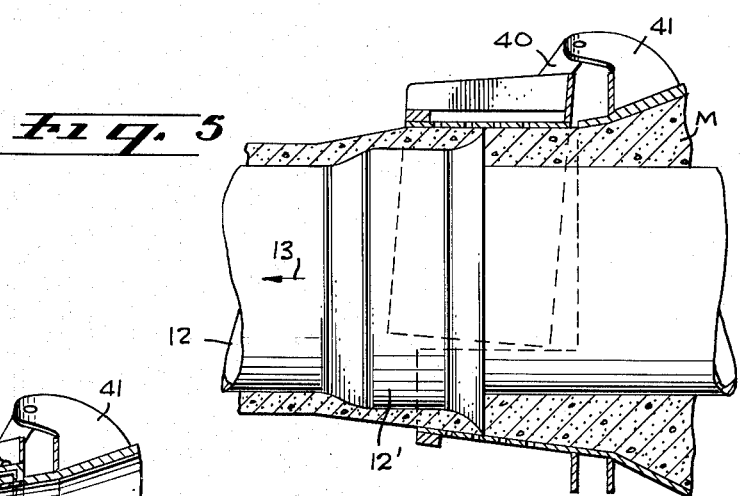
FIG. 5 is a view similar to FIG. 2 showing the operation of the parts when an enlarged section of pipe is passing therethrough.

Each hingedly mounted section 36 is provided with a hinge arm 40 which is pivotally secured to a bracket arm 41 on the cone section 34. Each hingedly mounted section is yieldably held in the position in which it is shown in FIGS. 2–4 by a flat or leaf spring 42. This is hingedly mounted at its outer end at 43 upon a bracket 44 near the outer end of the hinged section. The spring passes through a guide 46 which has a slot 47 therein for the purpose and terminates at its other end above a step 48 formed on the main cone. At its inner end the spring is provided with a set screw 50 which can be adjusted to vary the force exerted by the spring tending to maintain the hinged section in the position shown in FIGS. 2, 3, and 4.

Both the hinged sections 36 and the stationary portion 39 may be apertured with a series of holes 51 for the purpose of dehydrating and deaerating the coating when Portland cement mortar is used.

In the operation of the device, normally, when the major portion of the pipe is being coated, the hinged sections 36 are in the position in which they appear in FIGS. 2, 3, and 4 being yieldably held in such position by their springs 42. However, when an enlarged portion of the pipe, such as the bell end 12' (FIG. 5), passes through the extrusion cone, the two hingedly mounted sections 36 retract or pivot outwardly as they are engaged by the enlarged end to in effect expand the cone and permit the enlarged end 12' of the pipe to pass through the extrusion cone and be coated. While this results in a slot opening or appearing between the sections 36 and between each of them and section 89, as soon as the enlarged end of the pipe passes through the sections they return to their normal positions, closing the slots. Thus, loss of material through the slots is not serious, since they exist for only short durations and no slot develops at the bottom part of the extrusion cone.

Figure 6:
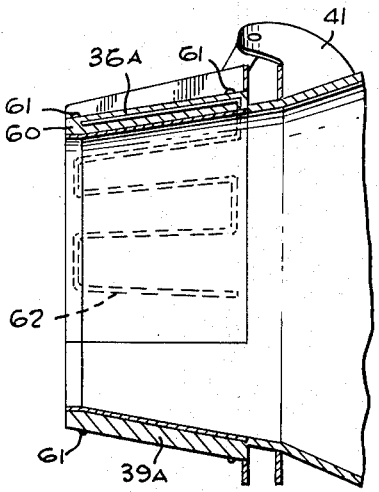
FIG. 6 is a view similar to FIG. 2 but showing an alternate form of the invention.

As heretofore indicated, the invention is also useful for applying coatings of a type wherein the coating material must be extruded through a heated member and for this purpose, in FIG. 6 I show an alternate form of the invention wherein heating shoes 60 are mounted on the hinged sections 36A and the portion 39A of an extrusion cone which is basically the same as the one previously described, however in this case no holes 51 are provided. The heating shoes may be attached by screws 61 or other desired means. The shoes are shown provided with an electrical resistance-type heating rod 62, but alternately they may be provided with passages for the use of a hot fluid.

Although I have illustrated and described a preferred form of my invention, I contemplate that various changes and modifications can be made therein without departing from the invention, the scope of which is indicated by the following claims.

I claim:

1. In apparatus for extruding a fluid coating material onto a pipe or the like including a casing adapted to contain the coating material and having an outlet opening through which the pipe is passed, cone means through which the material is extruded, comprising a main cone secured to said casing and providing a frusto-conical relatively steeply converging wall forming a passage beyond said opening, an extrusion cone attached to said main cone and providing a frusto-conical wall means substantially less steep than said main cone and forming a continuation of said main cone, the wall means of said extrusion cone including a stationary portion and movable sections, said movable sections being adjacently disposed and together extending circumferentially for more than 180°, means mounting said movable sections to swing freely outwardly on axes adjacent the main cone and extending transversely of the axis of the cones, and spring means operatively connected between said movable sections and said main cone yieldably resisting outward movement of said movable sections.

2. Apparatus as set forth in claim 1 in which there are two movable sections in the extrusion cone each of which extends about 120° circumferentially and in which the stationary portion forms the bottom portion of the extrusion cone.

3. Apparatus as set forth in claim 1 in which said spring means comprises a leaf spring secured to the outer end portion of each said movable section and movably anchored to said main cone.

4. In apparatus for extruding a fluid coating material onto a pipe or the like, a casing adapted to contain the coating material through which the pipe is passed axially, said casing having an inlet and an outlet through which the pipe passes, a main cone attached to said casing at said outlet providing a relatively steep frusto-conical wall beyond said opening, an extrusion cone attached to said main cone and forming a continuation thereof, said extrusion cone providing a relatively flatter frusto-conical wall beyond said main cone, said extrusion cone being formed of sections, some of said sections being hingedly mounted to swing outwardly on axes extending transversely of the axis of the cones and adjacent said main cone, and spring means operatively connected between the hingedly mounted sections of said extrusion cone and said main cone yieldably resisting outward movement of said movable sections.

5. In apparatus for extruding a fluid coating material onto a pipe or the like, a casing adapted to contain the coating material and through which the pipe is passed axially, an extrusion cone attached to said casing comprising wall means defining a hollow frusto-conical member, said wall means including a stationary portion and movable sections, said movable sections being mounted upon said casing for radially outward swinging movement upon axes extending transversely of the cone and adjacent the inner end of the cone, and spring means operatively associated with said movable sections and said casing yieldably resisting outward swinging movement of the movable sections, said movable sections being otherwise freely swingable on their axes.

6. In apparatus for extruding a fluid coating material onto a pipe or the like having a casing adapted to contain the coating material and through which the pipe is passed axially, an extrusion cone means attached to said casing, comprising wall means of frusto-conical shape, said wall means including at least one movable section extending a substantial distance circumferentially of the cone means, means pivotally mounting said movable section adjacent its inner end for swinging movement about an axis extending normal to the axis of the cone means, a leaf spring pivotally secured to the movable section adjacent its outer end, an apertured guide receiving said spring at a region intermediate its ends, said spring extending normal to the pivotal axis of the movable section, and an adjustment screw at the inner end of said spring bearing upon a stationary part of said cone means.

References Cited by the Examiner

UNITED STATES PATENTS

| | | | |
|---|---|---|---|
| 446,064 | 2/1891 | Hemenway | 25—104 |
| 1,071,600 | 8/1913 | Baly | 25—11 |
| 2,014,378 | 9/1935 | Gardiner et al. | 25—38 |
| 2,053,307 | 9/1936 | Wilson | 25—38 |
| 2,186,361 | 1/1940 | Bryan et al. | 25—38 |
| 2,231,250 | 2/1941 | Bryan | 25—38 |
| 2,287,826 | 6/1942 | Postlewaite et al. | 25—38 |
| 3,102,319 | 9/1963 | Hamson | 25—38 |

J. SPENCER OVERHOLSER, *Primary Examiner.*

ROBERT F. WHITE, MICHAEL V. BRINDISI,
*Examiners.*